(12) United States Patent
Watanabe et al.

(10) Patent No.: US 11,579,552 B2
(45) Date of Patent: Feb. 14, 2023

(54) DISPLAYING DEVICE AND IMAGE FORMING APPARATUS

(71) Applicant: CANON KABUSHIKI KAISHA, Tokyo (JP)

(72) Inventors: Tatsuhito Watanabe, Tokyo (JP); Shingo Hattori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 17/106,611

(22) Filed: Nov. 30, 2020

(65) Prior Publication Data

US 2021/0165354 A1 Jun. 3, 2021

(30) Foreign Application Priority Data

Dec. 3, 2019 (JP) .............................. JP2019-218764

(51) Int. Cl.
*G03G 15/00* (2006.01)
*G02F 1/1333* (2006.01)
*H04N 1/00* (2006.01)

(52) U.S. Cl.
CPC ..... *G03G 15/5016* (2013.01); *G02F 1/13338* (2013.01); *G02F 1/133308* (2013.01); *H04N 1/00392* (2013.01); *H04N 1/00411* (2013.01); *H04N 1/00496* (2013.01); *H04N 1/00559* (2013.01)

(58) Field of Classification Search
CPC .......... G03G 15/5016; G02F 1/133308; G02F 1/13338; H04N 1/00392; H04N 1/00411; H04N 1/00496; H04N 1/00559; H01L 27/3202
See application file for complete search history.

(56) References Cited

U.S. PATENT DOCUMENTS

| | | | |
|---|---|---|---|
| 7,352,568 B2 | 4/2008 | Ishida et al. | |
| 10,290,827 B2 | 5/2019 | Katagiri et al. | |
| 10,474,271 B2 | 11/2019 | Kim et al. | |
| 2007/0080957 A1 | 4/2007 | Ishida et al. | |
| 2011/0235254 A1* | 9/2011 | Uchida | G03G 15/5016 399/81 |
| 2016/0034087 A1 | 2/2016 | Kim et al. | |
| 2018/0019435 A1* | 1/2018 | Katagiri | H01L 27/3202 |
| 2020/0050313 A1 | 2/2020 | Kim et al. | |

FOREIGN PATENT DOCUMENTS

| | | |
|---|---|---|
| JP | 2007-086585 A | 4/2007 |
| JP | 2018-010158 A | 1/2018 |
| JP | 2018-067323 A | 4/2018 |

* cited by examiner

*Primary Examiner* — Hoang X Ngo
(74) *Attorney, Agent, or Firm* — Venable LLP

(57) ABSTRACT

A display device usable with an image forming apparatus includes a liquid crystal unit including a liquid crystal screen and a frame supporting the liquid crystal screen; a supporting member of metal supporting the liquid crystal unit; and an insulative spacer providing a space between the frame and the supporting member at a position of the frame corresponding to an outside area of a display area of the liquid crystal screen.

12 Claims, 13 Drawing Sheets

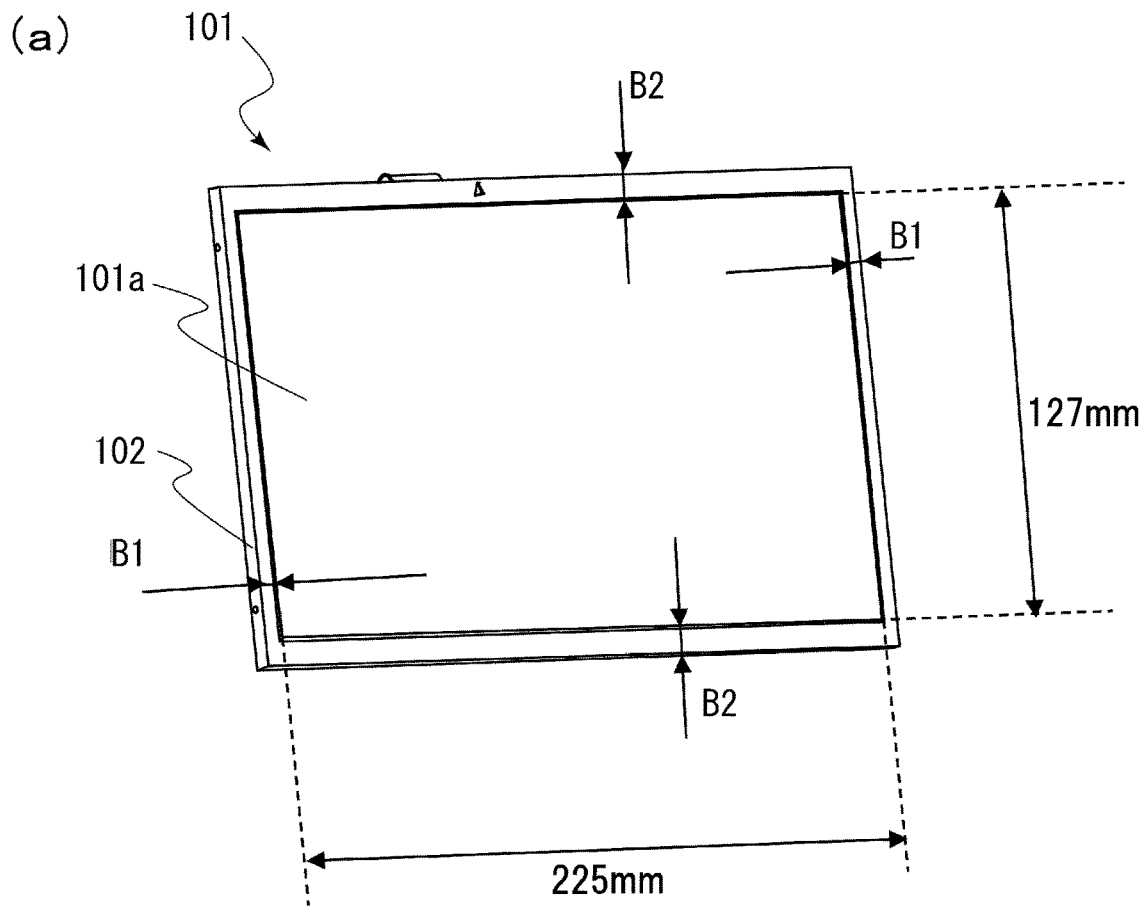
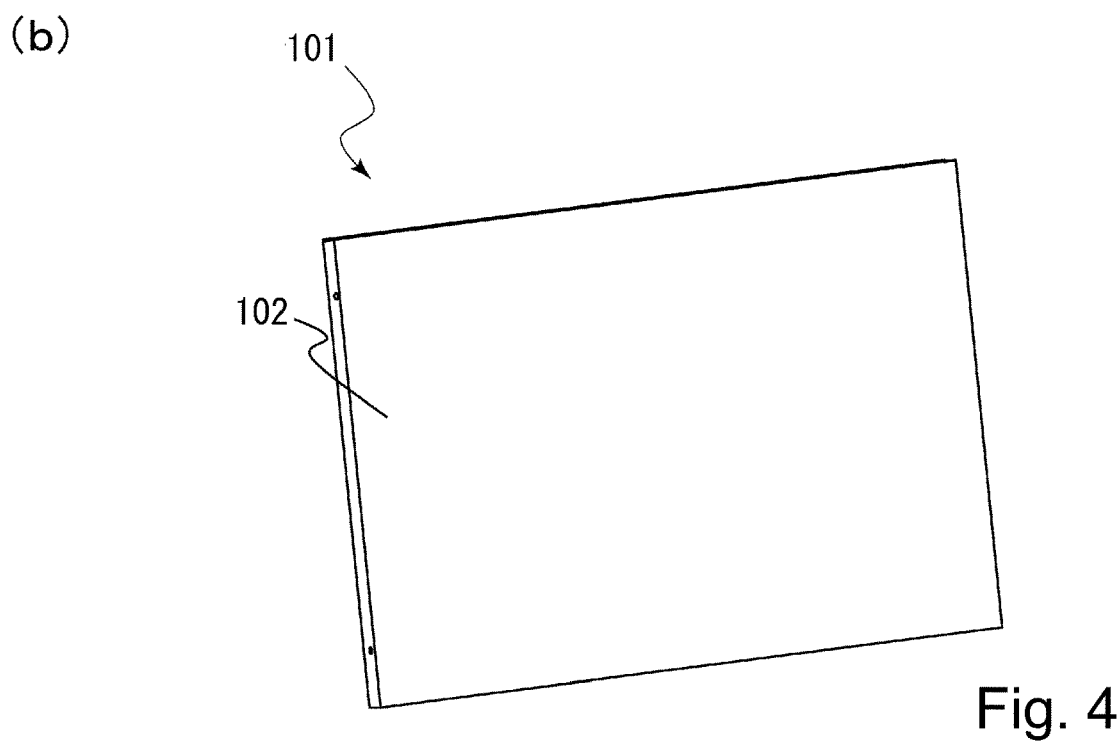
Fig. 4

------- : QUADRANT LINES

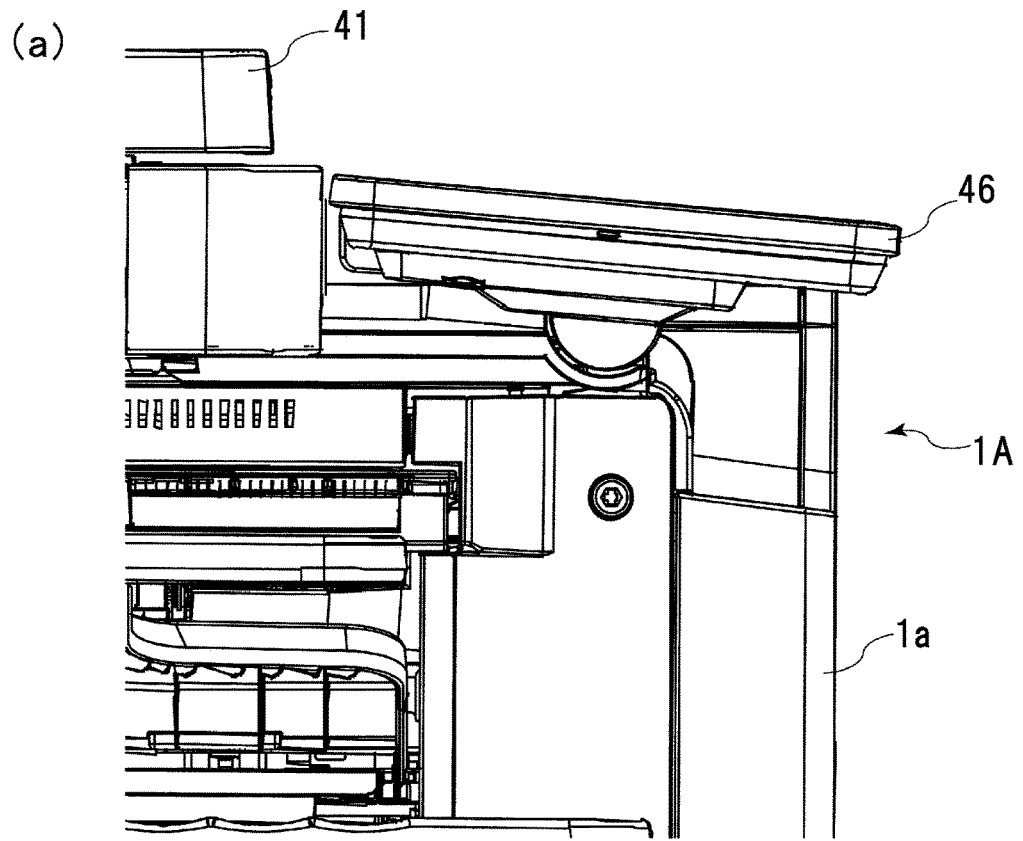
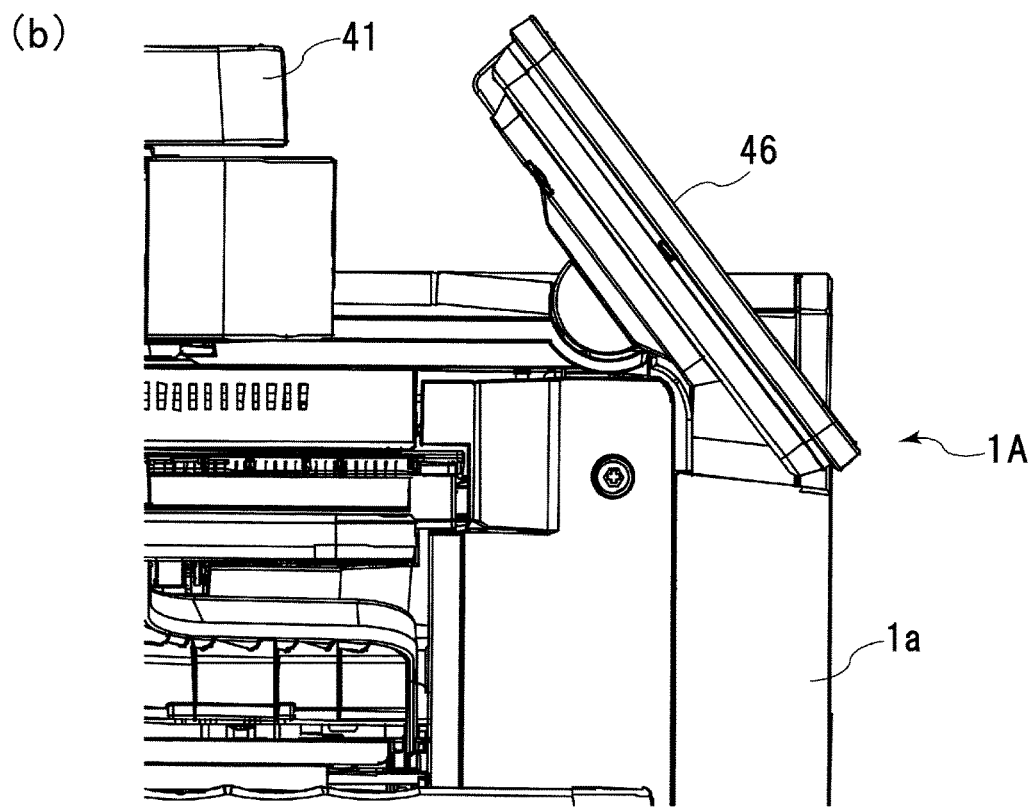
Fig. 13

DISPLAYING DEVICE AND IMAGE FORMING APPARATUS

FIELD OF THE INVENTION AND RELATED ART

The present invention relates to a display device having a liquid crystal screen, and an image forming apparatus such as a copying machine, a printing machine, a facsimileing machine, and a multifunction machine which is capable of performing one or more functions of the preceding machine.

There has been known an image forming apparatus equipped with a display device having a liquid crystal screen. The liquid crystal screen is held by a frame, making up a liquid crystal unit, which is supported by an image forming apparatus, with the placement of a supporting member between it and the image forming apparatus (for example, Japanese Laid-open Patent Application No. 2007-86585).

In recent years, it has been desired to reduce a display device in thickness. Consequently, it has been desired to reduce a display device in the gap between its liquid crystal screen and frame. However, reducing a display device in the gap between its liquid crystal screen and casing makes it possible for the liquid crystal screen to partially contact the casing, due to the nonuniformity, in shape, of the liquid crystal unit, and that of the member for supporting the liquid crystal unit. More specifically, the gap between the liquid crystal screen and frame is very small. Therefore, it is possible that as a liquid crystal unit and/or supporting member deforms, the frame is pressed by the supporting member, and therefore, the frame will come into contact with the rear surface of the liquid crystal screen.

As described above, it is possible that if the liquid crystal screen and frame of a display device contact with each other, ripples will appear on the liquid crystal screen. The ripples are more likely to occur to the liquid crystal screen of a display device having a touch panel which an operator can operate with a finger or the like than those of the other types of display device. For example, in case where the frame is under the pressure from the supporting member due to the deformation of the liquid crystal unit and/or supporting member, the aforementioned gap between the liquid crystal screen and frame is smaller than the one in a case where the frame is not under the pressure from the supporting member. Therefore, it is more likely to occur that as an operator presses the touch panel, the liquid crystal screen and frame contact with each other, and therefore, ripples are more likely to appear on the liquid crystal screen. Thus, there has been desired a display device which is unlikely to suffer from the ripples such as those described above.

SUMMARY OF THE INVENTION

According to an aspect of the present invention, there is provided a display device usable with an image forming apparatus, said display device comprising a liquid crystal unit including a liquid crystal screen and a frame supporting said liquid crystal screen; a supporting member of metal supporting said liquid crystal unit; and an insulative spacer providing a space between said frame and said supporting member at a position of said frame corresponding to an outside area of a display area of said liquid crystal screen.

Part (a) of FIG. 4 and part (b) of FIG. 4 are perspective views of the LCD unit in the first embodiment as seen from the front and rear sides, respectively of the LCD unit.

Figure 5:
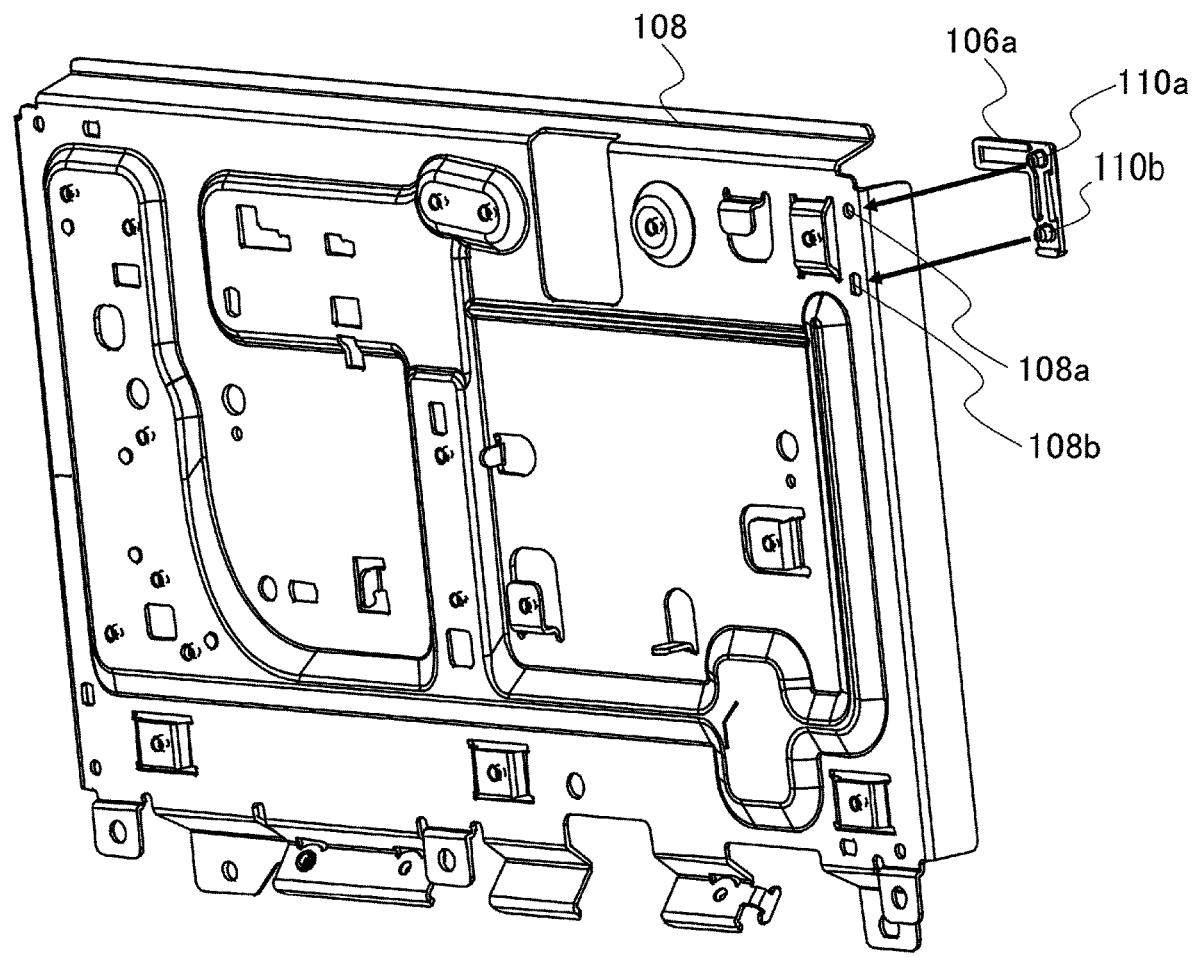

FIG. 5 is a perspective view of the base plate of the LCD unit; it shows how and to where of the base plate the spacers are attached, in the first embodiment.

Figure 6:
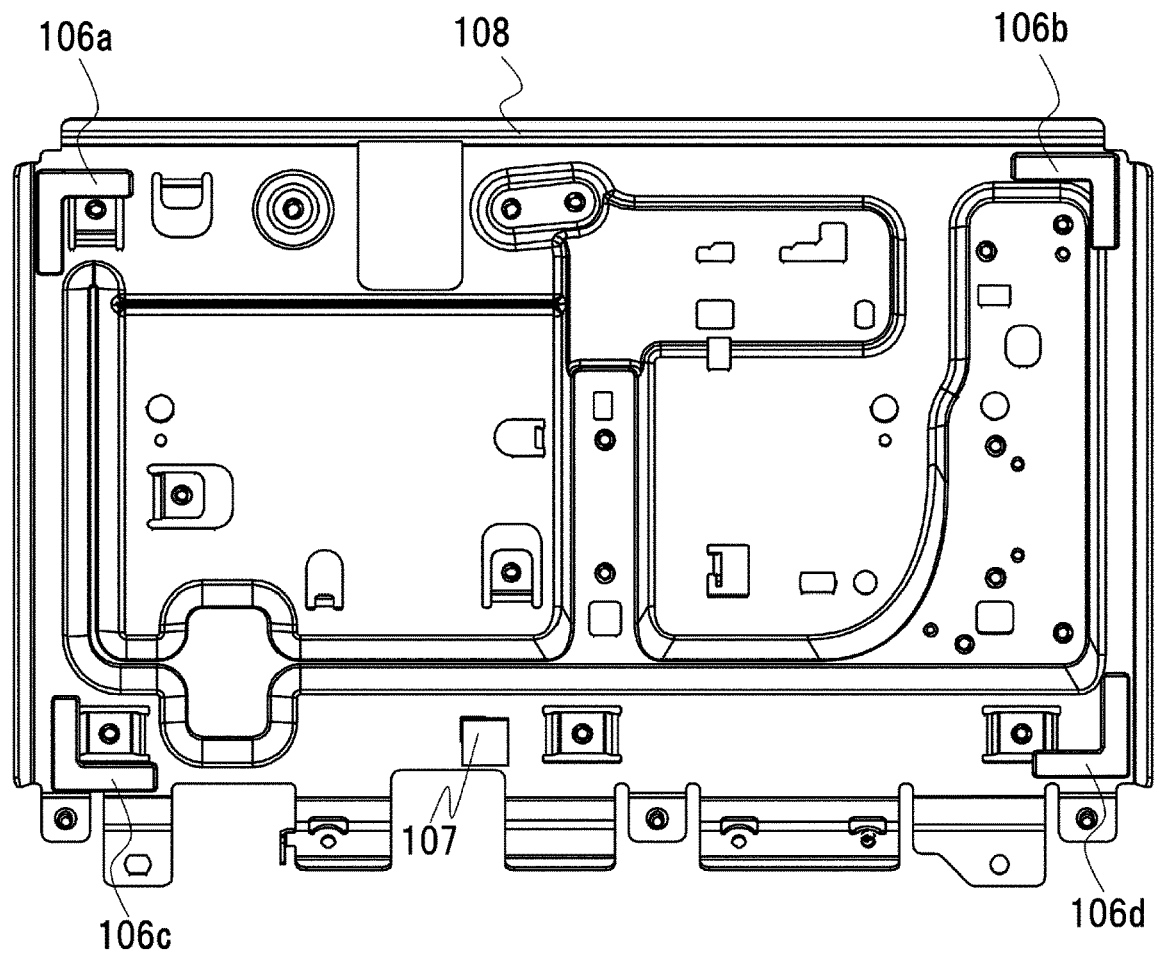

FIG. 6 is a schematic drawing of the LCD unit side of the base plate of the display device; it shows the positioning of the spacers and gasket relative to the LCD unit, in the first embodiment.

Figure 7:
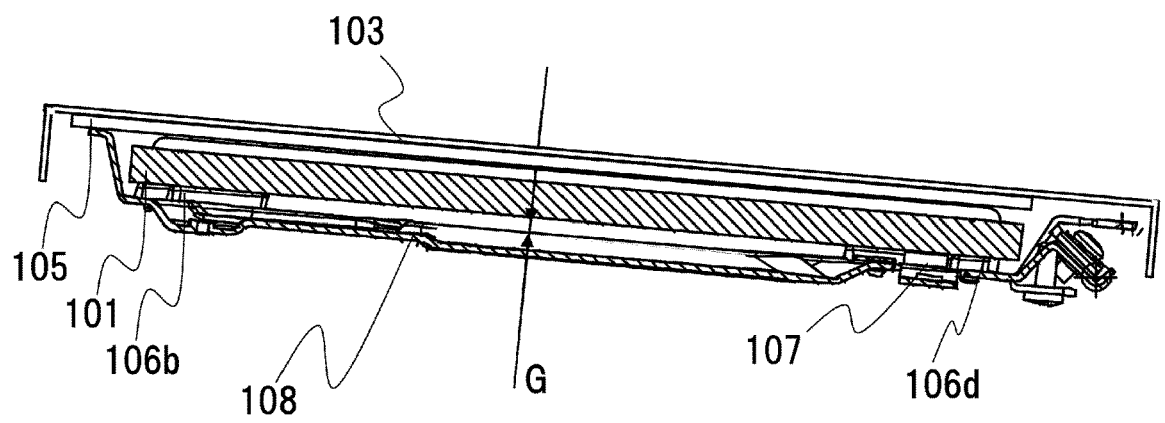

FIG. 7 is a sectional view of the display device in the first embodiment.

Figure 8:
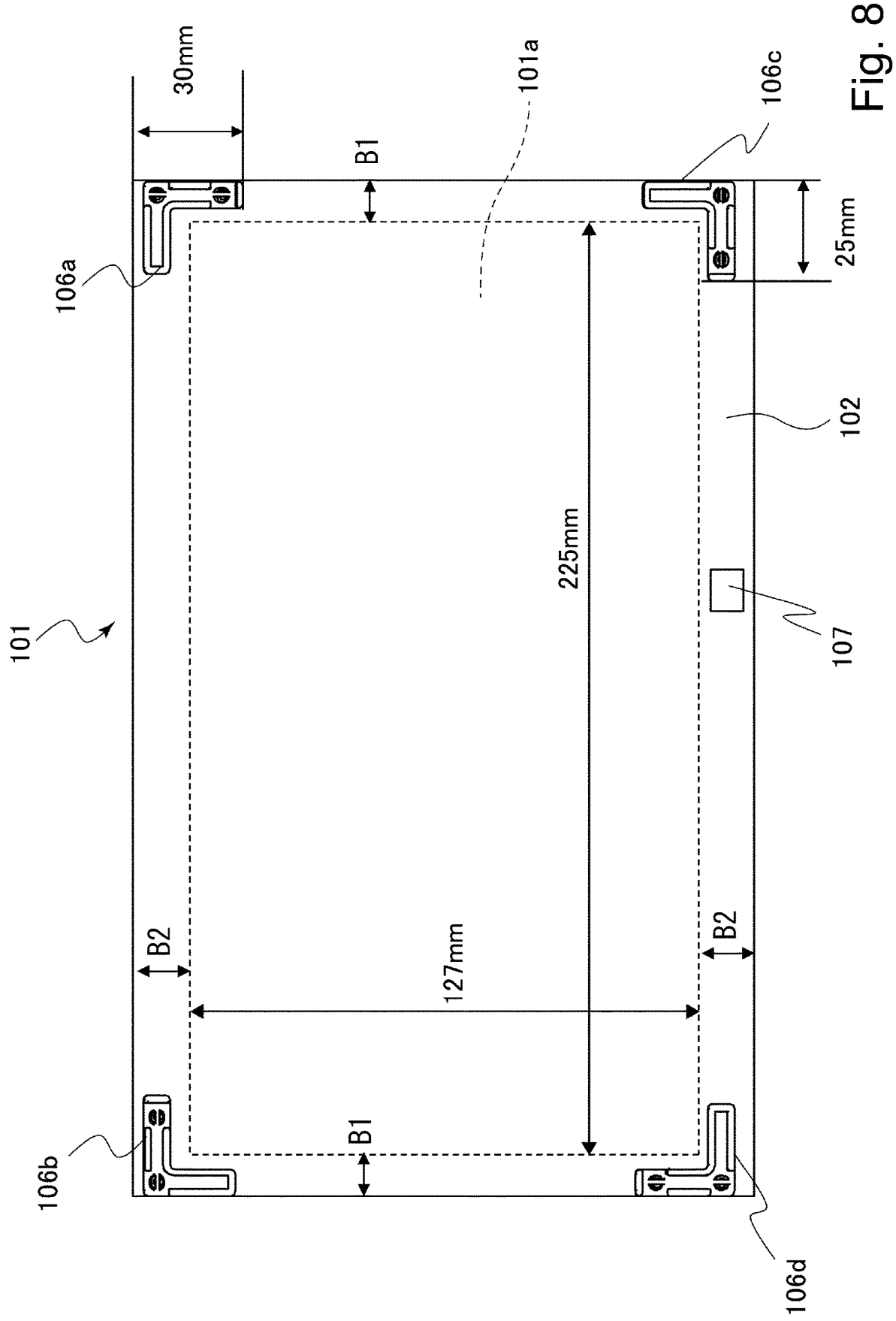

FIG. 8 is a schematic drawing of the base plate side of the LCD unit and the spacers thereon; it shows the positioning of the spacers and gasket relative to the LCD unit, in the first embodiment.

Figure 9:
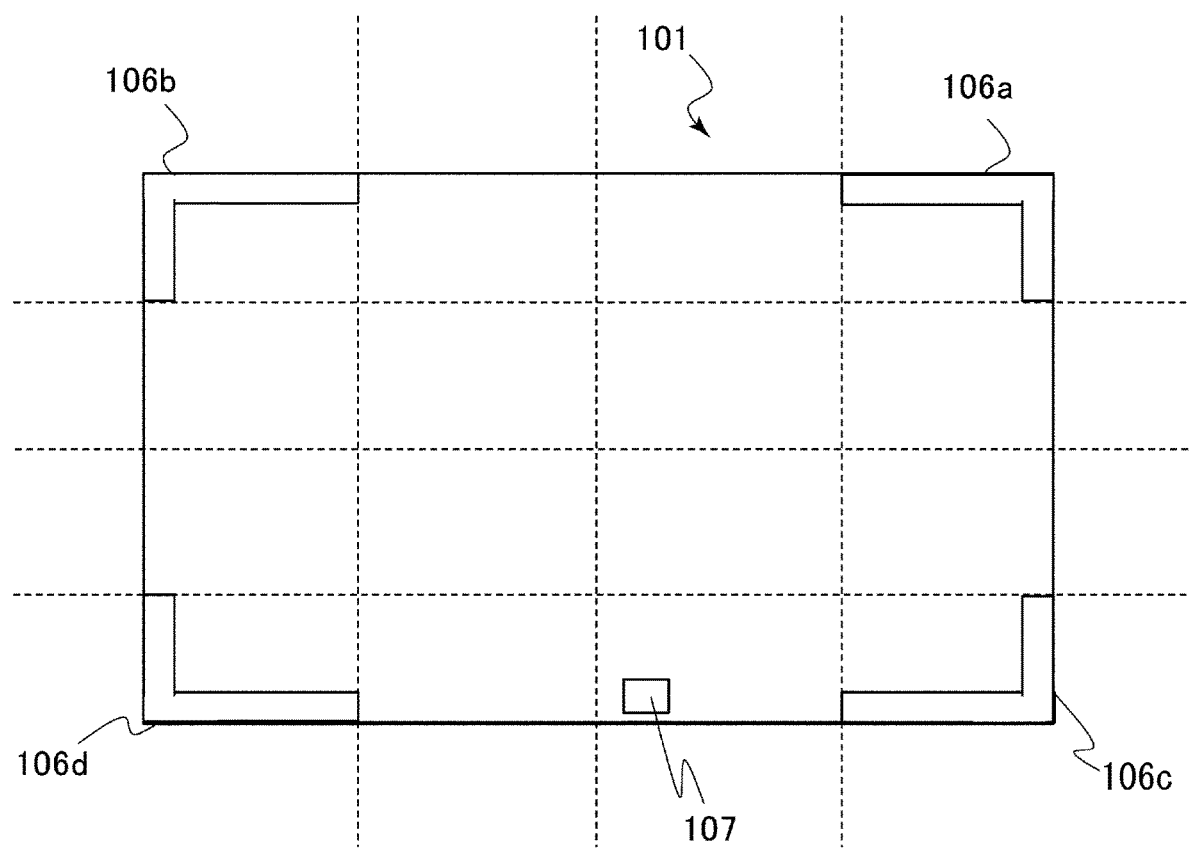

FIG. 9 is a schematic drawing of a combination of the LCD unit, spacers, and gasket, in the first modified version of the first embodiment; it shows the positioning of the spacers and gasket relative to the LCD unit.

Figure 10:
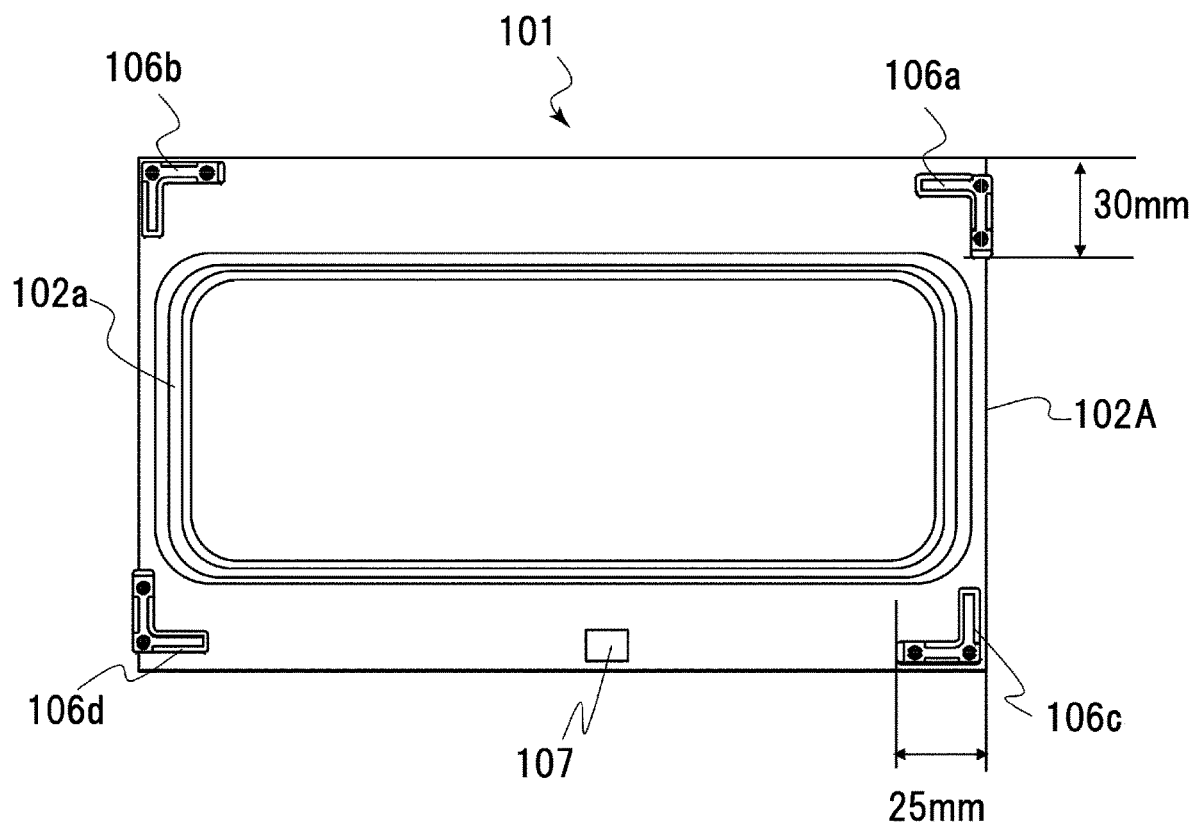

FIG. 10 is a schematic drawing of a combination of the LCD unit, spacers, and gasket, in the second modified version of the first embodiment; it shows the positioning of the spacers and gasket relative to the LCD unit.

Figure 11:
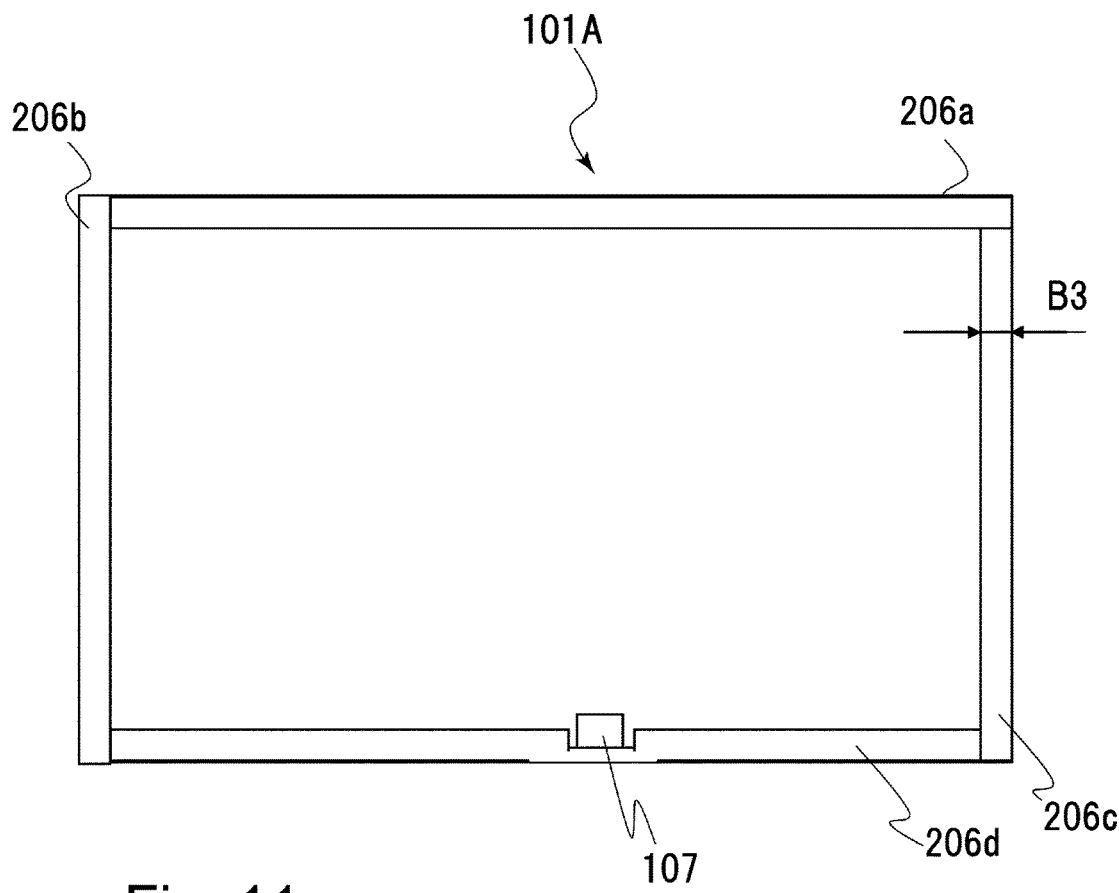

FIG. 11 is a schematic drawing of a combination of the LCD unit, spacers, and gasket, in the second embodiment; it shows the positioning of the spacers and gasket relative to the LCD unit.

Figure 12:
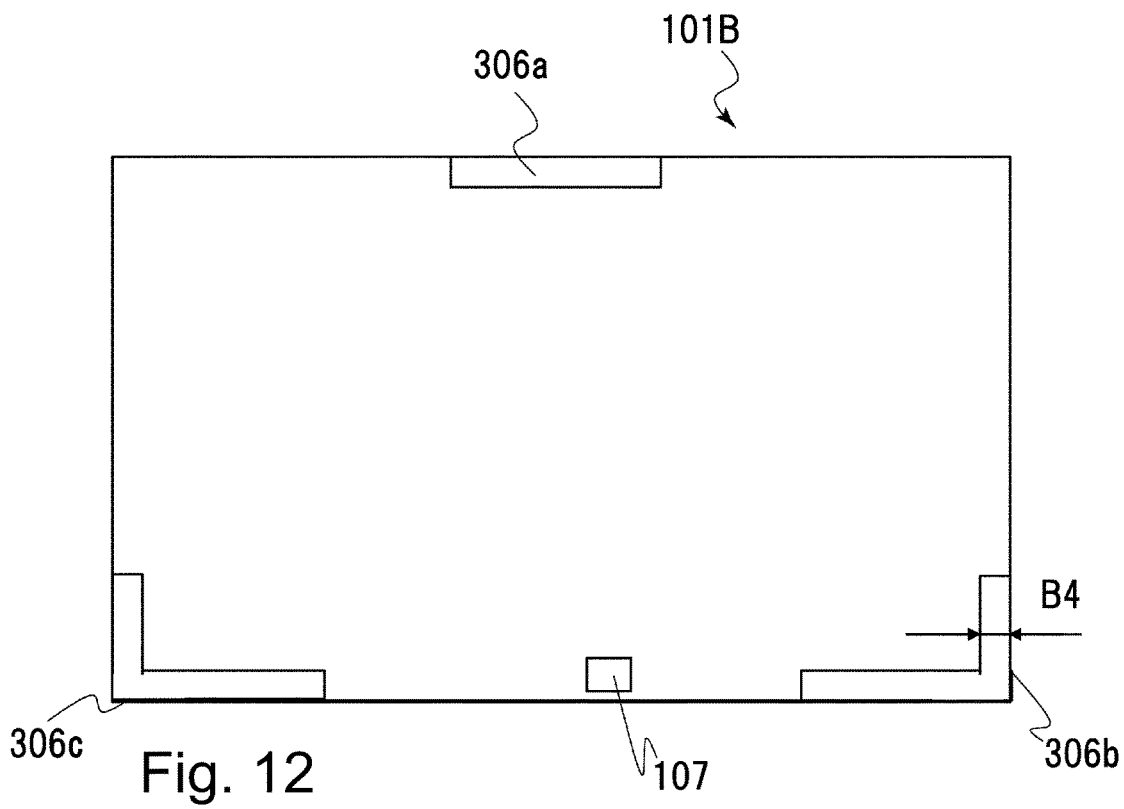

FIG. 12 is a schematic drawing of a combination of the LCD unit, spacers, and gasket, in the third embodiment; it shows the positioning of the spacers and gasket relative to the LCD unit.

Part (a) of FIG. 13 is a side view of the display device of the image forming apparatus, and its adjacencies, in the fourth embodiment of the present invention; it shows the structural arrangement for supporting the display device, and part (b) of FIG. 13 also is a side view of the display device of the image forming apparatus, and its adjacencies, in the fourth embodiment, except that in part (b) of FIG. 13, the display device is more upright in attitude than in part (a) of FIG. 13.

Figure 14:
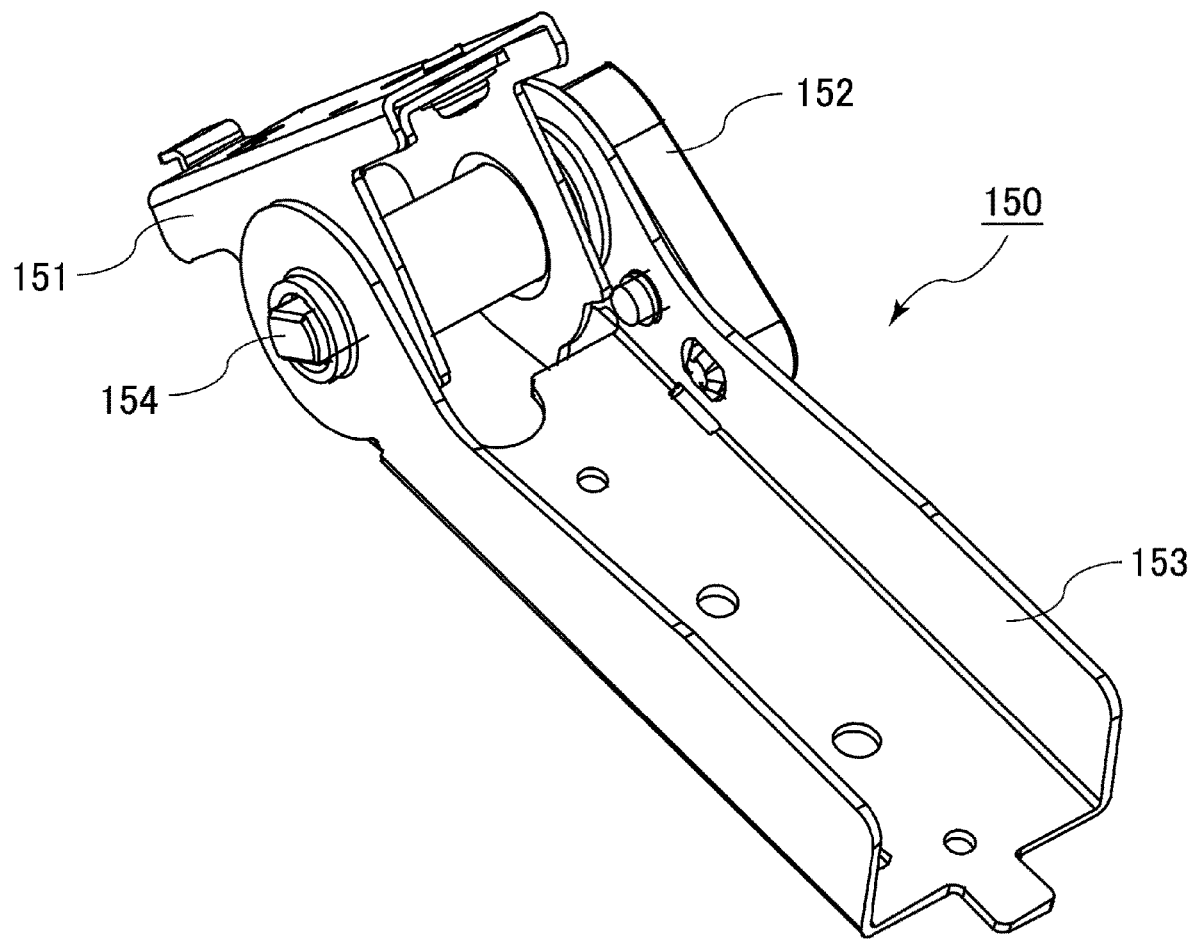

FIG. 14 is a perspective view of the pivotal supporting member for supporting the display device, in the fourth embodiment of the present invention.

Figure 15:
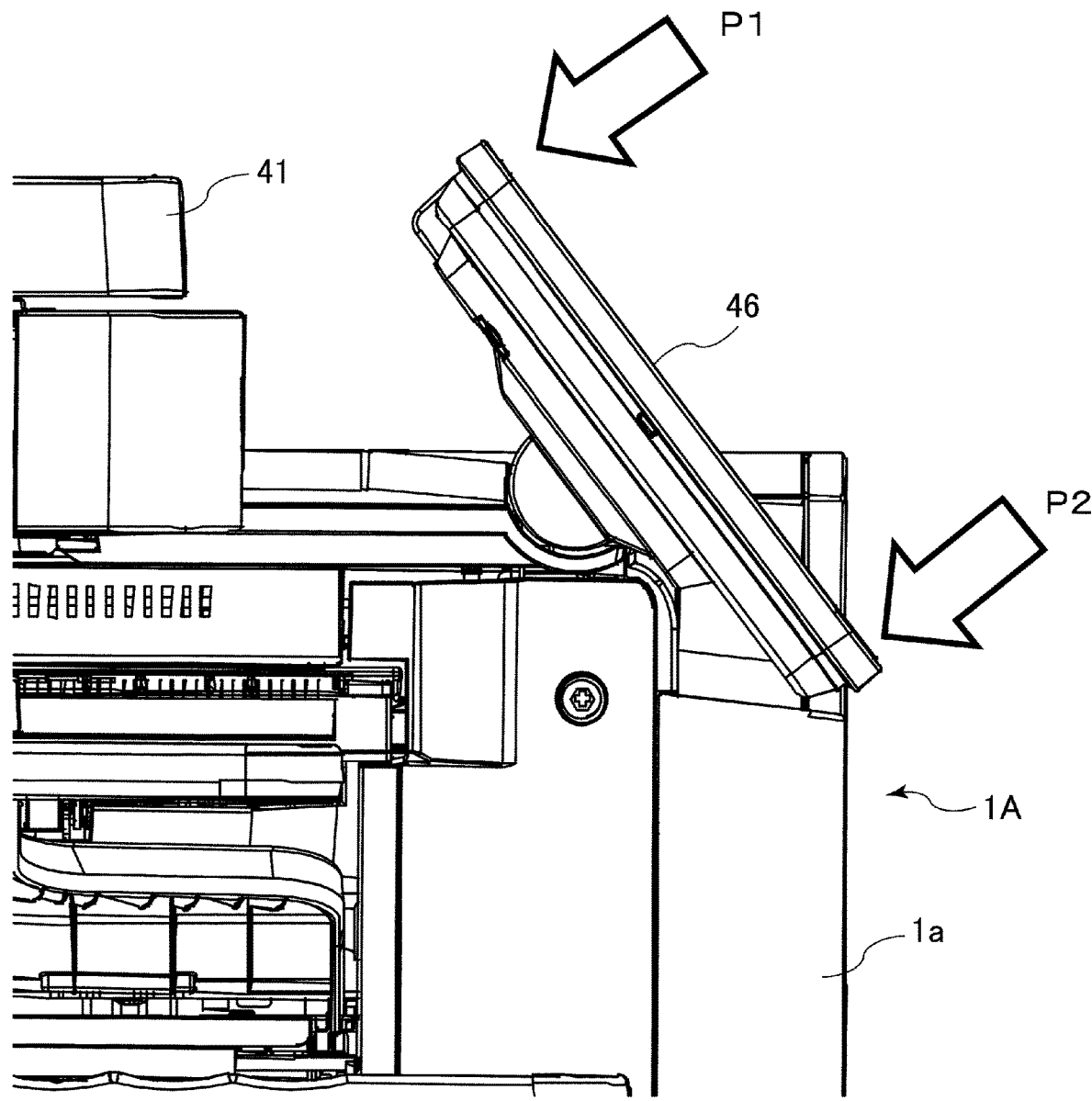

FIG. 15 is a side view of the display device of the image forming apparatus, and its adjacencies, in the fourth embodiment of the present invention; it shows the portions of the display device, which are under the force applied by an operator, and the direction of the force.

DESCRIPTION OF THE EMBODIMENTS

Embodiment 1

Referring to FIGS. 1-10, the first embodiment of the present invention is described. To begin with, referring to FIGS. 1 and 2, the image forming apparatus in this embodiment is described about its general structure.

[Image Forming Apparatus]

An image forming apparatus 1 is an electrophotographic full-color printer. It has four image formation stations, each of which has a photosensitive drum 6 as an image bearing member. The image forming apparatus 1 forms a toner image (image) in response to the image formation signals from its document reading portion 41, or a host device, such as a personal computer which is in connection to the image forming apparatus 1 in such a manner that communication is possible between the host device and image forming apparatus 1. As recording medium, a sheet of recording paper, plastic film, fabric, or the like can be listed. The four image formation stations forms yellow, magenta, cyan, and black toner images, one for one. Next, the image forming apparatus 1 is more concretely described. By the way, in the following description of the embodiments of the present invention, the recording medium will be referred to as a sheet S.

Figure 1:
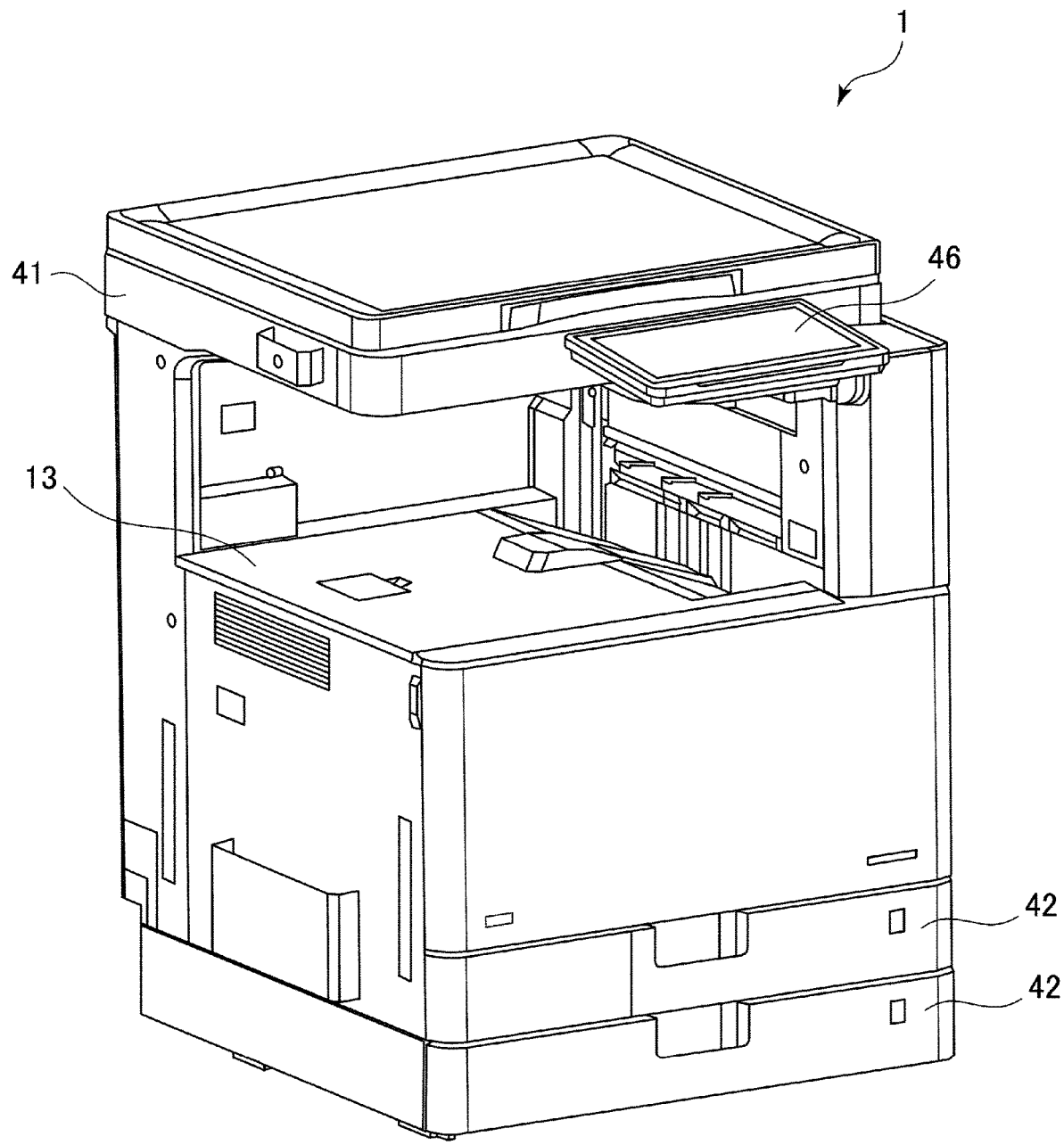
FIG. 1 is a perspective view of the image forming apparatus in the first embodiment of the present invention.
Figure 2:
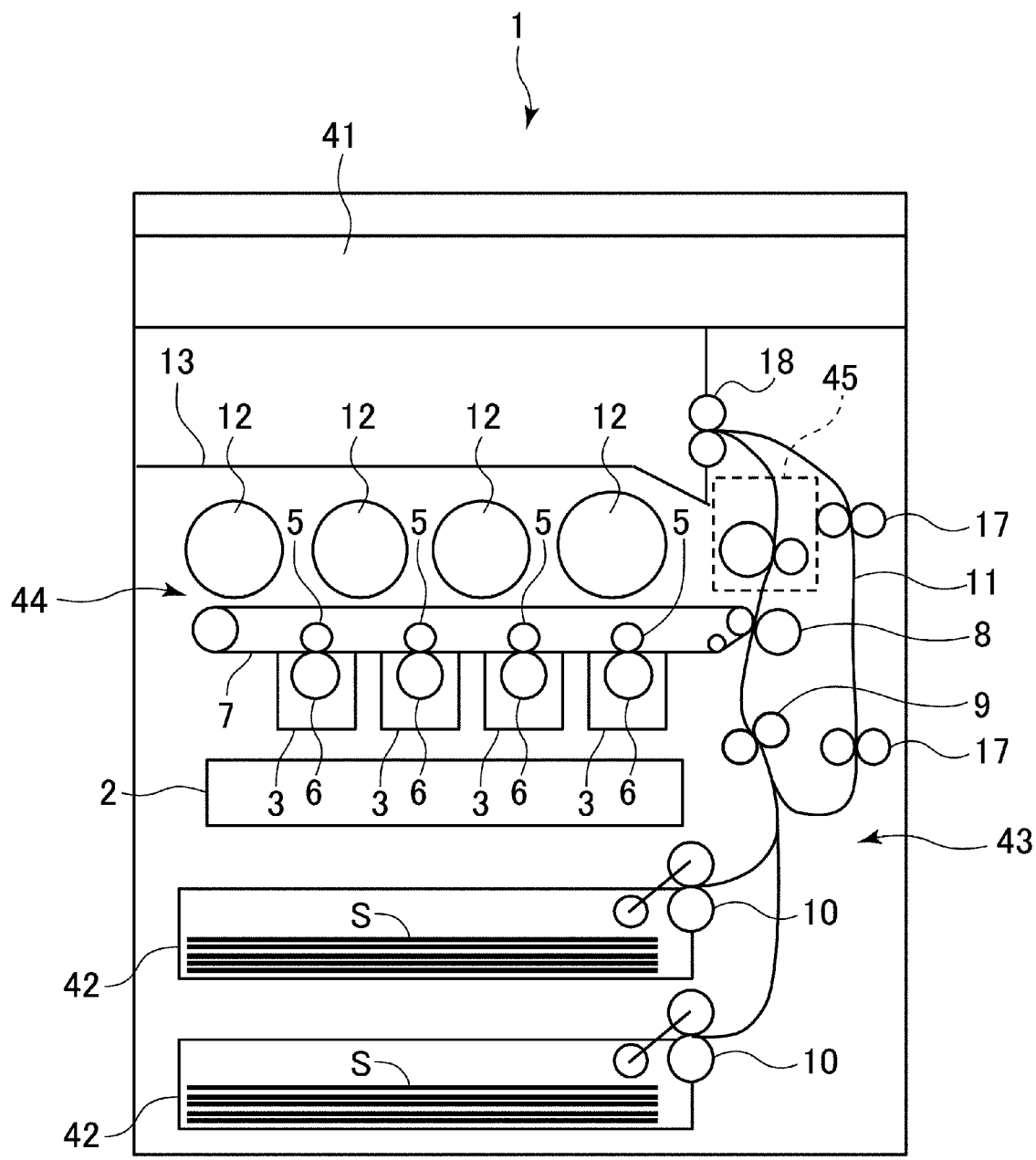
FIG. 2 is a sectional view of the image forming apparatus in the first embodiment; it shows the general structure of the apparatus.

Referring to FIGS. 1 and 2, the image forming apparatus 1 has a document reading portion 41, a sheet feeding portion 42, a sheet conveying portion 43, an image forming portion 44, a fixing device 45, and a display device 46. The sheet feeding portion 42, sheet conveying portion 43, image forming portion 44, and fixing device 45 are within the casing 1a of the image forming apparatus 1, whereas the display device 46 is outside the casing 1a.

The image forming portion 44 has: the four image formation portions mentioned above, an intermediary transfer belt 7, and an exposing unit 2. Each image formation station has a photosensitive drum 6, which is a cylindrical photosensitive member. Disposed in the adjacencies of the peripheral surface of the photosensitive drum 6 are unshown charging device, developing device, and cleaner, which belong to a process cartridge 3. There is disposed on the top side of the combination of process cartridges 3, the intermediary transfer belt 7 as an intermediary transferring member, in a manner to be in contact with each photosensitive drum 6. The photosensitive drum 6 and intermediary transfer belt 7 are rotationally driven during image formation.

The photosensitive drum 6 is charged by the corresponding unshown charging device. Then, it is exposed by the exposing unit 2 in response to the image formation signals. Consequently, a latent image is formed on the peripheral surface of the photosensitive drum 6. The latent image formed on the peripheral surface of the photosensitive drum 6 is developed into a toner image by the unshown developing device. To the developing device, toner is delivered from a toner bottle.

As the photosensitive drum 6 rotates, the toner image is conveyed into the primary transferring portion, in which the photosensitive drum 6 and intermediary transfer belt 7 are in contact with each other, and in which the toner images are sequentially transferred onto the intermediary transfer belt 7 by primary transfer rollers 5, as the primary transferring means, which opposes the photosensitive drums 6, one for one, with the presence of the intermediary transfer belt 7 between the photosensitive drum 6 and primary transfer roller 5. To the primary transfer roller 5, the primary transfer voltage is applied from an unshown electrical circuit board.

Sheets S in the sheet feeding portion 42 are sent one by one into the sheet conveying portion 43 by a pickup roller. Then, each sheet S is adjusted in conveyance timing by a pair of registration rollers 9. Then, it is conveyed to the nip (secondary transferring portion) which the secondary transfer roller and intermediary transfer belt 7 form. In the secondary transferring portion (nip), the toner images on the intermediary transfer belt 7, which are different in color, are transferred onto the sheet S. Thereafter, the sheet S is conveyed to the fixing device 45, in which it is subjected to heat and pressure. Consequently, the toner images melt and become fixed to the sheet S. Then, the sheet S is discharged into a delivery tray 13 by a pair of discharge rollers 18, which is on the downstream side of the fixing device 45.

In a case where an image is formed on both surfaces of a sheet S, the sheet S is conveyed to a reversal conveyance passage 11 after the fixation of a toner image to one of the two surfaces of the sheet 1. Then, the sheet S is conveyed to the secondary transferring portion for the second time by a reversal conveyance roller 17, and another toner image is transferred onto the other surface of the sheet S. Then, the sheet S is conveyed to the fixing device 45, in which the toner image on the other surface of the sheet S is fixed. Then, the sheet S is discharged into the delivery tray 13 by the pair of discharge rollers 18.

The document reading portion 41 is on top of the image forming apparatus 1. In the case of the image forming apparatus 1 shown in FIG. 1, the document reading portion 41 is on the top side of the delivery tray 13. It reads a document.

Referring to FIG. 1, the display device 46 is on the front side of the document reading portion 41. The "front side" is the side from which an operator operates the image forming apparatus 1. An operator inputs a desired command with the use of the display device 46. Not only does the image forming apparatus 1 carry out a preset operation in response to the inputted command, but also, a command transmitted from the printer driver, scanner driver, etc., which are in connection to a computer.

[Display Device]

Figure 3:
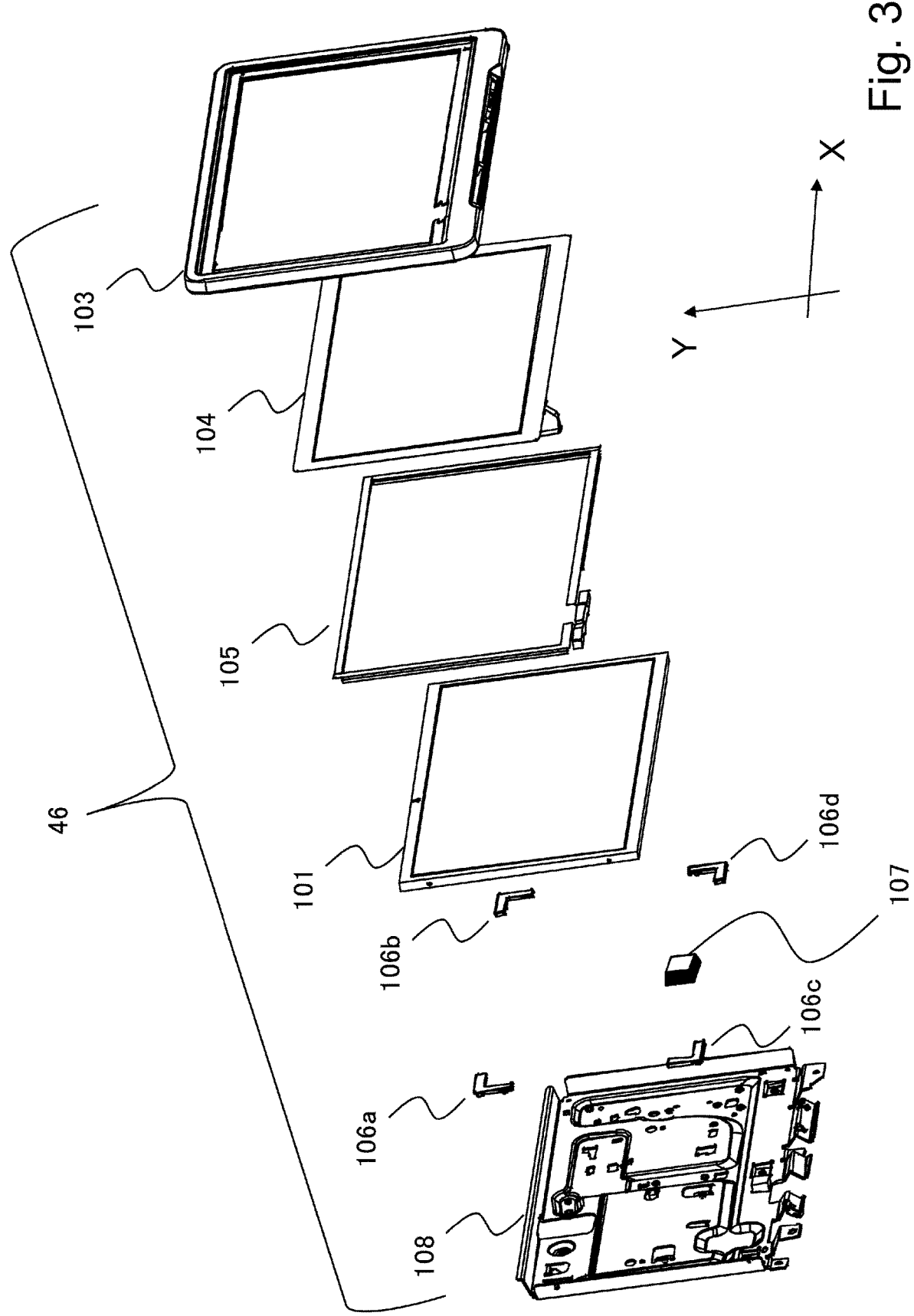
FIG. 3 is an exploded perspective view of the display device in the first embodiment.

Next, referring to FIGS. 3-8, the display device 46 in this embodiment is described. Referring to FIG. 3, there is disposed an LCD (Liquid Crystal Display) unit 101 as a liquid crystal unit in the display device 46. The display device 466 in this embodiment comprises: a screen cover 103; a touch panel 104; a sealing member 105; the LCD unit 101; spacers 106a-106d; a gasket 105 as an electrically conductive member; and a base plate 108 as a member which supports the LCD unit 101.

Referring to parts (a) and (b) of FIG. 4, the LCD unit 101 has: a flat liquid crystal screen 101a, which comprises an unshown back light; a polarization filter, etc.; and a LCD frame 102. The LCD unit 101 is roughly rectangular as it is seen from the direction which is perpendicular to the liquid crystal screen 101a. The LCD frame 102 is formed of a metallic substance or a resinous substance, which is higher in rigidity than the liquid crystal screen 101a. It covers the back surfaces, four lateral surfaces, and four edge portions of the liquid crystal screen 101a. It holds the liquid crystal screen 101a. The LCD frame 102 covers also vertical and horizontal edge portions of the front side of the liquid crystal screen 101a by widths of B1 and B2, respectively.

By the way, the "back surface" of the LCD unit 101 is the surface of the LCD unit 101, which faces the base plate 108. Further, in this embodiment, the thickness of the LCD unit 101 is 5.5 mm. The thinner the LCD unit 101 is, the more likely it is to be less in rigidity the LCD unit 101. Further, the liquid crystal screen 101a in this embodiment is 10.1 inch in size.

At this point in time, the principle of the occurrence of ripples on the liquid crystal screen is briefly described. If a given portion of the liquid crystal screen 101a changes in thickness, the liquid crystal screen 101a becomes nonuniform in its internal light blockage. Consequently, ripples appear on the liquid crystal screen 101a. That is, if something touches a given portion of the back surface of the liquid crystal screen 101a, that portion of the liquid crystal screen 101a changes in thickness. Consequently, ripples appear around this portion. Further, the thinner the LCD unit 101, the less rigid the LCD unit 101, and therefore, more likely it is to change in thickness, and therefore, is more likely to suffer from ripples. Thus, it is desired to provide a certain amount of space next to the back surface of the liquid crystal screen 101a, in order to prevent ripples such as the aforementioned ones from appearing.

For example, it is possible to support the LCD unit 101 by the entirety of the back surface of the LCD unit, by the base plate 108. If the LCD unit 101 is supported by the entirety of its back surface, it is possible that as the LCD unit 101 and/or base plate 108 deforms, a part of the base plate 108 presses the back surface of the LCD unit 101, making it possible that the LCD frame 102 of the LCD unit 101 comes into contact with the back surface of the liquid crystal screen 101a, causing ripples to appear on the surface of the LCD screen. In this embodiment, therefore, the display device 46 is structured as follows.

[Structure of Display Device]

As described above, the display device 46 in this embodiment comprises the screen cover 103, touch panel 104, sealing member 105, LCD unit 101, spacers 106a-106d, gasket 107, and base plate 108. Referring to FIG. 3, the screen cover 103 is equivalent to the exterior of the display device 46. It is the screen cover 103 that the touch panel 104 is attached. Further, the screen cover 103 is provided with an opening, which occupies the center portion of the screen cover 103, as shown in FIG. 3. It is through this opening that an operator can see the image on the liquid crystal screen 101a of the LCD unit 101 from the front side of the display device 46. The touch panel 104 is a panel that is touchable by an operator to input information into the image forming apparatus 1. There is provided the sealing member 105, which is in contact with the four edge portions of the back surface of the touch panel 104. The sealing member 105 may be monolithic, or made up of two or more pieces. The LCD unit 101 is attached to the screen cover 103 in such a manner that it compresses the sealing member 105 to fill the gaps between the screen cover 103 and LCD unit 101. Further, the LCD unit 101 is precisely positioned in terms of both the X and Y directions (that is, directions which are parallel to the liquid crystal screen 101a), by the unshown positioning portions of the screen cover 103.

On the other hand, the spacers 106a-106d and gasket 107 are attached to the LCD unit 101 side of the base plate 108. In this embodiment, the spacers 106a-106d are molded of a resinous substance, and are 2.35 mm in thickness. They are desired to be molded of an electrically insulative resin, for example, ABS (acrylonitrilebutadienestyrene plastic), PC+ABS (polycarbonate+acrylonitrilebutadiene-styrene plastic), or the like.

Referring to FIG. 5, the spacer 106a is provided with a pair of bosses 110a and 110b. On the other hand, the base plate 108 is provided with a pair of holes 108a and 108b. The spacer 106a is attached to the base plate 108 by the insertion of the bosses 110a and 110b into the holes 110a and 110b, respectively. Further, each of the bosses 110a and 110b of the spacer 106a are provided with a slit, the position of which corresponds to the center of the hole 108a (108b). The external diameter of each of the bosses 110a and 110b is greater than the internal diameter of each of the holes 108a and 108b. Because of this structural arrangement, as the bosses 110a and 110b of the spacer 106a are inserted into the holes 108a and 108b, respectively, the spacer 106a can be temporarily held to the base plate 108 by the friction between the bosses 110a and 110b and the walls of the holes 108a and 108b, respectively, of the base plate 108. This applies to the other spacers 106b-106d as well.

While being temporarily held to the base plate 108 as described above, the spacers 106a-106d are sandwiched between the LCD unit 101 and base plate 108 in terms of the thickness direction of the display device 46, as will be described later. Therefore, it does not occur that the bosses 110a-110b slip out of the holes 108a-108d, respectively. By the way, in this embodiment, the spacers 106a-106d are positioned at the four corners of the LCD unit 101, one for one. Therefore, the spacers 106a-106d are held at the four corners of the base plate 108, one for one, as shown in FIG. 6.

The gasket 107, which is an electrically conductive member, is positioned between the LCD unit 101 and base plate 108. It is less in rigidity than the spacers 106a-106d, and is electrically conductive. More concretely, the gasket 107 is formed of a combination of electrically conductive fiber and urethane foam. It is positioned next to the back surface of the LCD unit 101. The role of the gasket 107 is to provide electrical connection between the LCD unit 101 and base plate 108 by remaining in contact with both of them, in order to reduce the display device 46 in electromagnetic noises. The thickness of the gasket 107 is 13 mm. It is formed of urethane foam, being therefore extremely low in rigidity, and soft.

Referring to 7, after the attachment of the spacers 106a-106d (FIG. 7 shows only spacers 106b and 106d) and gasket 107 to the base plate 108, the base plate 108 is attached to the screen cover 103 in a manner to sandwich the LCD unit 101 between itself and screen cover 103. Then, the base plate 108 and screen cover 103 are fixed to each other with the use of small screws. During this process, the sealing member 105 compensates for the inaccuracy in the dimension of each of the aforementioned components, in terms of the thickness direction of the display device 46.

Since the display device 46 is structured as described above, it is possible to provide a gap G between the back surface of the LCD unit 101 and base plate 108 with the use of the spacers 106a-106d. This gap G is such a gap that is provided when the back surface of the LCD unit 101 and base plate 108 are closest to each other. In other words, it is the gap which is provided by the spacers 106a-106d. Therefore, even if the Liquid crystal screen 101A and/or base plate 108 deforms, they are prevented from coming into contact with each other.

Both the LCD frame 102 and base plate 108, of which the LCD unit 101 is comprised, are made of a metallic substance. Therefore, as the two come into contact with each other, an electrical passage is established between the two. The electrical resistance of the area of contact between the two is affected in amount by the contact pressure between the two. Therefore, how well the LCD unit 101 is grounded is affected by the contact pressure between the two. It is possible that the change which occurs to the grounding of the LCD unit 101 will cause noises, which in turn causes the liquid crystal screen 101a to unsatisfactorily display an image. In this embodiment, therefore, the insulative spacers 106a-106d are provided. Therefore, it does not occur that the LCD frame 102 and base plate 108 directly contact each other.

There is a following relationship among the amount P (N) of force applied by an operator, width L (mm) of the LCD unit, coefficient E (N/mm$^2$) of vertical elasticity, secondary moment I of LCD unit at a plane of cross-section, and amount δ of warping of the LCD unit:

$\delta = PL^3/(48EI)$.

The gap G is desired to be no less than this amount δ of warping. Therefore, if the tolerance for the thickness of the spacer 106a is ±0.1 mm, the desirable thickness t for the spacers 106a-106d is ±0.1 mm.

By the way, since the gasket 107 is a soft component as described above, it is compressed to the thickness of the spacers. Therefore, even if the LCD unit 101 or base plate 108 warps, the gasket 107 deforms in a manner to accommodate the warping. Therefore, even if the area of warping is within the visible area of the liquid crystal screen 101a, ripples do not occur. On the other hand, in this state, the spacers 106a-106d are hardly compressed, and therefore, it is ensured that the gap G is provided as described above. Further, the material for the spacers 106a-106d, and the thickness of them, are set so that the gap G can be provided as described above, even if the spacers 106a-106d are compressed by a small amount.

[Positioning of Spacers]

Next, referring to FIGS. 8-10, the positioning of the spacers 106a-106d is described. FIGS. 8-10 are drawings of the LCD unit 101 as seen from the backside of the LCD unit 101. FIG. 9 shows the first example of modification of the first embodiment. FIG. 10 shows the second example of modification of the first embodiment.

Referring to FIG. 8, the widths of the areas in which the spacers 106a-106d are positioned are no more than the widths B1 and B2 of the LCD frame 102 fitted around the edge portions of the Liquid crystal screen 101A. That is, in terms of the direction which is perpendicular to the liquid crystal screen 101a, the spacers 106a-106d are positioned between the base plate 108 and the invisible area of the liquid crystal screen 101a.

If even only one of the spacers 106a-106d is positioned in an area which is outside the visible area of the liquid crystal screen 101a in terms of the direction which is parallel to the liquid crystal screen 101a, as an operator touches the touch panel 104 or in the like case, the LCD unit 101 is pinched by the finger of the operator and the spacer 106 and the spacer, making it possible for the LCD unit 101 to be compressed. Therefore, it is possible that ripples will appear on the liquid crystal screen 101a. Therefore, such a component as the spacer that has a certain amount of rigidity, and is placed in contact with the LCD frame 102, should not be positioned in an area which is within the visible area, in terms of the direction parallel to the liquid crystal screen 101a. By the way, as described above, even if a given component is in contact with the visible area of the liquid crystal screen 101a of the LCD frame 102, as long as the component is extremely low in rigidity, being therefore soft like the gasket 107, it is extremely unlikely for the liquid crystal screen 101a to suffer from ripples.

Here, the portion of the liquid crystal screen 101a, which is on the outward side of the visible area of the liquid crystal screen 101a, is the portion of the liquid crystal screen 101a, which is covered with the screen cover 103, as seen from the front side of the display device 46 (that is, from the direction which is perpendicular to the liquid crystal screen 101a). That is, the portion of the surface of the liquid crystal screen 101a, which is on the center side of the portion of the surface of the liquid crystal screen 101a, which is covered with the screen cover 103, is the "visible portion". This visible portion" is a portion of the surface of the liquid crystal screen 101a of the display device 46, across which an image is displayable, that is, such a portion of the surface of the liquid crystal screen 101a that an image displayed across this portion of the surface of the liquid crystal screen 101a is visible by a user. Referring to FIG. 3, in this embodiment, the "visible area" is 127 mm×225 mm in size. The fringe portion of the front surface of the liquid crystal screen 101a, which correspond in position to the areas in FIG. 8, the widths of which are B1 and B2, is invisible (out-of-sight) area of the front surface of the liquid crystal screen 101a. The areas, which are B1 and B2 in width, are covered with the LCD frame 102. Therefore, the area of the liquid crystal screen 101a, which correspond in position to these areas, which are B1 and B2 in width, is not visible to a user (operator). However, the display device 46 may be structured so that the portion of the liquid crystal screen 101a, which correspond to the invisible (out-of-sight) portion of the front surface of the liquid crystal screen 101a, is exposed from the LCD frame 102 by a width of several millimeters or so. That is, it is not mandatory that only the portion of the front surface of the liquid crystal screen 101a, which is covered by the LCD frame 102, is referred to as "invisible (out-of-sight) area". That is, it is acceptable that the area of the front surface of the liquid crystal screen 101a, across which no image is displayed, is exposed from the LCD frame 102 by a small amount, as long as the amount falls within a tolerance (0-5 mm).

Further, the portion of the LCD frame 102, which is outside the "visible area" of the front surface of the liquid crystal screen 101a, means the portion of the LCD frame 102, which corresponds to the invisible (out-of-sight) portion of the front surface of the LCD unit 101, which is outside the "visible area" in terms of the direction parallel to the liquid crystal screen 101a. That is, the area of the front surface of the liquid crystal screen 101a, which is on the inward side of the portion of the front surface of the liquid crystal screen 101a, which is covered with the LCD frame 102, is the area of the front surface of the liquid crystal screen 101a, across which an image can be displayed. On the other hand, the back side of the liquid crystal screen 101a is entirely covered with the LCD frame 102. By the way, the size of the area of the liquid crystal screen 101a, which is not covered with the LCD frame 102, is greater than the size of the opening of the screen cover 103.

Regarding the spacers 106a-106d, it is desired that no less than three spacers are positioned apart from each other in terms of the direction parallel to the liquid crystal screen 101a. In this embodiment, four spacers (spacers 106a-106d) are positioned at four corners of the LCD unit 101, one for one, as described above. More concretely, the spacers 106a-106d are positioned 25-30 mm inward of the edges of the LCD unit 101. The four spacers 106a-106d are identical.

In this embodiment of the present invention, in a case where the display device 46 is touched by an operator to be operated, the display device 46 is subjected to a certain amount of force. This force, however, is caught by the areas of base plate 108, which are B1 and B2 in width, through the spacers 106a-106d which are between the LCD unit 101 and base plate 108. Therefore, it does not occur that the liquid crystal screen 101a is made to warp by this force. Therefore, the phenomenon that as an operator touches the liquid crystal screen 101a, ripples appears on the front surface of the liquid crystal screen 101a can be prevented. The force to which the touch panel 104 is subjected when an operator touches the touch panel 104 to operate the image forming apparatus 1, is dispersed because the spacers 106a-106d are strategically distributed. That is, it does not occur that the force is borne by a single spot. Therefore, the display device 46 in this embodiment is substantially smaller in the possibility that the LCD frame 102 will be made to warp by the force applied to the front surface of the liquid crystal screen 101*a* by an operator than any conventional display device.

By the way, referring to FIG. 9, for example, it is desired that each of the spacers 106*a*-106*d* is positioned within its corresponding corner area of the liquid crystal screen 101*a*, the horizontal edge of which is no more in length than ¼ of the horizontal edge of the liquid crystal screen 101*a*, and ¼ the vertical edge of which is no more in length than ¼ of the vertical edge of the liquid crystal screen 101*a*. If the area in which each of the spacers 106*a*-106*d* is positioned is greater in size than (¼ the length of the horizontal edge of the liquid crystal screen 101*a*)×(¼ the vertical edge), the edge of the LCD frame 102 and spacer 106 contact with each other, in the area which is greater in size than ½ the aforementioned area, in a case where there are two spacers per edge. If the LCD frame 102 and spacer 106 contact each other, it is possible that the effects of the warping and/or the like of the base plate 108 will transfer to the LCD unit 101 through the spacers, and make the liquid crystal screen 101*a* warp. Therefore, it is desired to place each of the spacers 106*a*-106*d* no more than ¼ the length of the corresponding edge of the LCD unit 101 from the corresponding corner of the LCD unit 101.

Further, referring to FIG. 10, in some cases, the display device 46 is structured so that certain portions of the LCD frame 102A are higher in rigidity than the other portions. In the case of the structural arrangement shown in FIG. 10, the LCD frame 102A are crimped across the area between the fringe portions and center portion to make the LCD frame 102A higher in rigidity. That is, the crimped portion 102*a* is higher in rigidity. In this case, the spacers 106*a*-106*d* are positioned in such areas that are on the outside of the crimped area 102*a*.

Embodiment 2

Next, referring to FIG. 11, the second embodiment of the present invention is described. In the first embodiment described above, the spacers were positioned in the four corners of the LCD unit 101, one for one. In this embodiment, however, the four spacers are given such length and width that each spacer matches in length and width the corresponding edge portion of the liquid crystal screen 101A. Otherwise, this embodiment is similar to the first one in structural arrangement and function. Therefore, the components, portions thereof, etc. of the display device 46 in this embodiment, which are similar in structure to the counterparts in the first embodiment, are given the same referential codes as those given to the counterparts, and are given only simplified in description and/or illustration, or are not described or illustrated. Thus, this embodiment is described about only the difference of this embodiment from the first one.

FIG. 11 is a drawing of the Liquid crystal screen 101A in this embodiment, as seen from the back side. In this embodiment, the spacers 206*a*-206*d* are positioned in such a manner as a picture frame is positioned relative to a picture. The width of each spacer 206 is less than that of the corresponding edge portion of the liquid crystal screen 101A, in which the spacer 206 is positioned. By the way, the Liquid crystal screen 101A is roughly rectangular like the one in the first embodiment, as seen from the direction which is perpendicular to the Liquid crystal screen 101A (FIG. 3). Further, the spacers 206*a*-206*d* are similar in material and thickness to the spacers 106*a*-106*d* in the first embodiment.

That is, in this embodiment, the spacers 206*a*-206*d* are positioned relative to the Liquid crystal screen 101A, in such a manner as a picture frame is positioned relative to a picture. Positioning the spacers 206*a*-206*d* in the manner described above is more effective to reduce a display device in the amount of warping, which is attributable to the force applied by an operator to a touch screen. In particular, in this embodiment, the spacers 206*a*-206*d* are positioned so that their positions correspond to those of the four edge portions of the Liquid crystal screen 101A in terms of the lengthwise direction of each edge portion.

However, the width B3 of each of the spacers 206*a*-206*d* is no more than the widths B1 and B2 of the LCD frame 102 with which the edge portions of the Liquid crystal screen 101A are covered (part (a) of FIG. 4). That is, also in this embodiment, the spacers 206*a*-206*d* are positioned on the outward side of the displaying area of the Liquid crystal screen 101A. Therefore, this embodiment also can prevent the problem that as an operator touches a touch panel, ripples appear on the front surface of the liquid crystal screen 101A.

It is not mandatory that the spacers 206*a*-206*d* are long enough to reach from one end of the corresponding edge portion of the LCD frame 102 to the other. In a case where each of the spacers 206*a*-206*d* is not long enough to reach from one end of the corresponding edge portion of the LCD frame 102 to the other, the length of each spacer 206 may be made to be no less, or no more, than ¼ of the corresponding edge portion of the 1102. However, the width of each spacer is desired to be less than the width of the corresponding edge portion of the liquid crystal screen 101A.

Embodiment 3

Next, referring to FIG. 12, the third embodiment of the present invention is described. In the first embodiment described above, each of the four corners of the LCD unit 101 is provided with a spacer 106. In this embodiment, three edge portions of the LCD unit 101*b* are provided with a spacer. Otherwise, this embodiment is the same in the structure and function of the display device 46 as the first embodiment. Thus, the components, portions thereof, etc., of the display device, which are similar in structure to the counterparts in the first embodiment, are given the same referential codes, and are simplified in description and/or illustration, or not described at all. That is, this embodiment is described only about its difference from the first embodiment.

FIG. 12 is a schematic drawing of the LCD unit 101B in this embodiment, as seen from the back side of the LCD unit 101B. In this embodiment, three portions of the 101B are provided with the spacers 306*a*-306*d*, one for one. More concretely, the spacer 306*a* is disposed so that its position 1 corresponds to roughly the center of one of two longer edge portions of the LCD unit 101B (which is roughly rectangular), in terms of the lengthwise direction of the LCD unit 101B. As for the spacers 306*b* and 306*c*, they are disposed so that their positions correspond to the corner portions, one for one, which the other longer edge portion and two shorter edge portions form. By the way, the spaces 306*a*-306*c* are similar in material and thickness to the spacers 106*a*-106*d* in the first embodiment.

All that is necessary to hold the LCD unit 101B parallel to the base plate 108 (FIG. 3, for example) is to support the LCD unit 101B by at least three points. In this embodiment, therefore, three spacers 306*a*-306*c* are disposed so that their positions are separate from each other in terms of the direction which is parallel to the Liquid crystal screen 101A (FIG. 3). Therefore, the display device in this embodiment is smaller in component count than the display device 46 in the first embodiment. That is, this embodiment can reduce a display device in component count.

The width B4 of each of the spacers 306a-306c is no more than the widths B1 and B2, by which the LCD frame 102 covers the edge portion of the liquid crystal screen 101A (part (a) of FIG. 4). That is, also in this embodiment, the spacers 306a-306d are on the outward side of the visible area of the liquid crystal screen 101A. Therefore, it is possible to prevent the problem that as an operator touches the touch panel of a display device, ripples appear on the liquid crystal screen 101a. By the way, also in this embodiment, it is desired that each of the spacers 306a-306d is positioned no farther than ¼ the length of the corresponding edge portion of the LCD unit 101, from the corresponding corner of the LCD unit 101.

Embodiment 4

Next, referring to parts (a) and (b) of FIG. 13, FIGS. 14 and 15, the fourth embodiment of the present invention is described. In the first embodiment described above, the display device 46 was not pivotally movable relative to the casing 1a of the image forming apparatus 1. In comparison, in this embodiment, the display device 46 is pivotally movable relative to the casing 1a of the image forming apparatus 1A. Otherwise, the display device 46 in this embodiment is similar in structure and function to the display device 46 in the first embodiment. Thus, the components, portions thereof, etc., of the display device 46 in this embodiment, which are similar in structure to the counterparts in the first embodiment are given the same referential codes as those given to the counterparts in the first embodiment, and are simplified in description and illustration, or not described at all. That is, this embodiment is described only about its difference from the first embodiment.

This embodiment is different from the first embodiment in the method for supporting the display device 46. More concretely, in this embodiment, the display device 46 is structured so that its display device 46 can be tilted relative to the image forming apparatus 1A. The display device 46 itself may be the same in structure to any one display device in the first to third embodiments.

Next, how the display device 46 is supported in this embodiment is described. The display device 46 is used by various operators which are different in height, for example, a tall operator, a short operator, an operator in a wheelchair, and so on. Thus, it is desired to be constructed so that its liquid crystal screen 101a is easy to see regardless of the position of user's eyes in terms of the vertical direction. Therefore, it is desired that the display device 46 can be vertically pivoted, and also, can be held at a desired angle. Parts (a) and (b) of FIG. 13 are side views of the display device 46, and its adjacencies, in this embodiment, as seen from the left side of the image forming apparatus 1A. Part (a) of FIG. 13 shows the display device 46 and its adjacencies when the display device 46 is in a position into which the display device 46 will be tilted up if it is expected that an operator is tall. Part (b) of FIG. 13 shows the display device 46 and its adjacencies when the display device 46 is in a position into which the display device 46 will be tilted down when it is expected that an operator is in a wheelchair. That is, part (b) of FIG. 13 shows the display device 46 when the display device 46 has been upwardly tilted compared to when it is in part (a) of FIG. 13.

The display device 46 can be held in any attitude between the one shown in part (a) of FIG. 12 and the one shown in FIG. 13b). Shown in FIG. 14 is a holding member 150 for making possible to hold the display device 46 to the casing 1a of the image forming apparatus 1A in such a manner that the display device 46 can be pivotally movable to be held at any angle within the aforementioned range. Referring to FIG. 14, the holding member 150 comprises a holding portion 151 for holding the display device 46, a pivotal portion 152, and a fixing portion 153 by which the holding member 150 is fixed to the image forming apparatus 1A. The pivotal portion 152 is provided with a free-stop hinge 154 which is for holding the display device 46 at a desired angle within the aforementioned range.

The holding portion 151 is a portion which holds the display device 46 by the center portion of the display device 46. The fixing portion 153 is a portion by which the holding portion 150 is fixed to the casing 1a of the image forming apparatus 1A. The pivotal portion 152 is placed between the holding portion 151 and the fixing portion 153. It holds the holding portion 151 in such a manner that the holding portion 151 is pivotally movable relative to the fixing portion 153 about a roughly horizontal shaft. There are several methods employable by the free-stop hinge 154. In this embodiment, however, a pipe type free-stop hinge, which comprises a piece of resinous pipe, and a metallic shaft which is pressed into the pipe, is employed. Since the holding portion 151 is structured as described above, it can holds the display device 46 held by the holding portion 151, in such a manner that the display device 46 is pivotally movable relative to the casing 1a of the image forming apparatus 1A in the vertical direction, and also, can hold the display device 46 at a desired angle.

If the image forming apparatus 1A and display device 46 are structured so that the display device 46 can be tilted relative to the casing 1a of the image forming apparatus 1A, the display device 46 is indirectly attached to the casing 1a through the pivotally holding member 150. That is, the four corners of the display device 46 are not attached to the casing 1a. Therefore, the display device 46 is more likely to be twisted by the force applied thereto by an operator than otherwise. For example, referring to FIG. 15, if an operator applies a force P1 to the top edge portion of the display device 46 while applying a force P2 to the bottom edge portion of the display device 46, when the operator is operating the display device 46, the display device 46 may be twisted about the pivotal portion 152. If the display device 46 is twisted, the gap between the LCD unit 101 in the display device 46 and the base plate 108 (FIGS. 3 and 7) reduces, possibly allowing the LCD unit 101 and base plate 108 to contact each other.

However, as long as spacers are placed between the LCD unit 101 and base plate 108 in such a manner as those in the first to third embodiments reduce, it is assured that a gap is maintained between the LCD unit 101 and base plate 108 by these spacers. Therefore, even if the display device 46 is twisted as described above, it is prevented that ripples appear on the Liquid crystal screen 101A.

<Miscellanies>

In each of the embodiments described above, three to four spaces were separately placed between the LCD unit and supporting plate. However, the number of the spacers may be five or more. Further, it is not mandatory that the spacers are shaped like those in the preceding embodiment. That is, they may be differently shaped from those in the preceding embodiment. For example, they may be round, oval, or rectangular, as they are seen from the direction which is perpendicular to the LCD screen.

Further, in each of the embodiments described above, the spacers were placed between the LCD unit and supporting plate. However, instead of placing the spacers between the LCD unit and supporting plate, the LCD unit or supporting plate may be provided with projections. That is, portions of the LCD frame of the LCD unit, which are on the outward side of the visible portion of the liquid crystal screen, or portions of the supporting plate of the LCD frame, which are on the outward side of the visible portion of the liquid crystal screen, may be provided with projections which are protrusive toward the former and latter, respectively, to provide a gap between the LCD unit and base plate 108. In such a case, the LCD frame should be formed of a resinous substance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-218764 filed on Dec. 3, 2019, which is hereby incorporated by reference herein in its entirety.

What is claimed is:

1. A display device usable with an image forming apparatus, the display device comprising:
    a liquid crystal unit including a liquid crystal screen and a frame supporting the liquid crystal screen;
    a first insulative spacer provided at a first position corresponding to an outside area of a display area of the liquid crystal screen, with one surface of the first insulative spacer intersecting a direction that is perpendicular to a display surface of the liquid crystal screen and contacting the frame;
    a second insulative spacer provided at a second position corresponding to the outside area of the display area of the liquid crystal screen, with one surface of the second insulative spacer intersecting the direction that is perpendicular to the display surface of the liquid crystal screen and contacting the frame; and
    a supporting member made of metal, with another surface of the first insulative spacer intersecting the direction that is perpendicular to the display surface of the liquid crystal screen and contacting the supporting member, with another surface of the second insulative spacer intersecting the direction that is perpendicular to the display surface of the liquid crystal screen and contacting the supporting member, and with the supporting member supporting the liquid crystal unit via the first insulative spacer and the second insulative spacer,
    wherein the first insulative spacer and the second insulative provide a gap between the frame and the supporting member.

2. A display device according to claim 1, wherein the frame has a stiffness higher than that of the liquid crystal screen.

3. A display device according to claim 1, wherein the liquid crystal unit includes a touch panel on which an operator is capable of inputting information by touching operation.

4. A display device according to claim 1, further including a third insulative spacer provided at a third position of the frame corresponding to the outside area of the display area of the liquid crystal screen.

5. A display device according to claim 1, wherein the liquid crystal unit has a substantially rectangular shape as seen in the direction perpendicular to the display surface of the liquid crystal screen, and the first insulative spacers, the second insulative spacer, and the third insulative spacer are disposed in a zone not more than ¼ of the length of one side of the liquid crystal unit.

6. A display device according to claim 5, wherein the spacers are provided at corner positions of the liquid crystal unit, respectively.

7. A display device according to claim 1, wherein the liquid crystal unit has a substantially rectangular shape as seen in the direction perpendicular to the display surface of the liquid crystal screen, and the spacers are provided at corner positions of the liquid crystal unit, respectively, and, at each side of the liquid crystal unit, a width of the spacer is less than that of a side on which the spacer is provided.

8. A display device according to claim 1, wherein the frame has a high stiffness portion having a stiffness higher than that of another portion, and the first insulative spacer and the second insulative spacer are disposed outside of the high stiffness portion.

9. A display device according to claim 1, further comprising an electroconductive member provided in contact with and between the frame and the supporting member, the electroconductive member having a stiffness less than that of the spacers.

10. A display device according to claim 9, wherein the electroconductive member is in contact with the supporting member and a portion of the frame corresponding to the display area of the liquid crystal screen.

11. An image forming apparatus comprising:
    a photosensitive member;
    an exposing unit configured to emit light illuminating the photosensitive member to form a latent image on the photosensitive member;
    a developing unit configured to develop the latent image with toner; and
    a display device according to claim 1.

12. An apparatus according to claim 11, wherein the display device is swingable relative to the image forming apparatus.

* * * * *